United States Patent [19]
Farfaglia

[11] 3,938,645
[45] Feb. 17, 1976

[54] GABLE-TOP CARTON TRANSFER APPARATUS AND METHOD

[75] Inventor: Silvio T. Farfaglia, Fulton, N.Y.

[73] Assignee: Phillips Petroleum Company, Bartlesville, Okla.

[22] Filed: Sept. 7, 1973

[21] Appl. No.: 395,030

[52] U.S. Cl. ............... 198/20 R; 198/32; 198/131; 198/218; 214/1 BB; 294/116
[51] Int. Cl.² .......................................... B65G 47/68
[58] Field of Search ............ 198/20 R, 32, 131, 218; 294/116; 214/1 BB, 1 BT

[56] References Cited
UNITED STATES PATENTS

| | | |
|---|---|---|
| 2,677,471 | 5/1954 | Skinner ............................ 214/1 BT |
| 2,833,185 | 5/1958 | Dixon .................................. 198/20 |
| 3,198,309 | 8/1965 | Ogawa .............................. 214/1 BB |
| 3,225,891 | 12/1965 | Hickin et al. ..................... 214/1 BT |
| 3,276,606 | 10/1966 | Marchand ......................... 214/1 BB |
| 3,318,630 | 5/1967 | Bryant .............................. 294/116 |
| 3,645,408 | 2/1972 | Bronzini............................ 214/1 BB |

Primary Examiner—Evon C. Blunk
Assistant Examiner—Jeffrey V. Nase

[57] ABSTRACT

Gable-top cartons are transferred from a first station to a second station by means of a transfer mechanism employing a clamp having opposing jaws which grip the sealed top of a container, holding the container while it is being moved from the first station to the second station, and releasing the container when it has arrived at its desired location in the second station.

16 Claims, 6 Drawing Figures

GABLE-TOP CARTON TRANSFER APPARATUS AND METHOD

This invention relates to method and apparatus for transferring a carton from a first station to a second station. In one aspect it relates to the use of one or more clamps to transfer a carton horizontally from a first station on an intermittently actuated conveyor to a second station on a continuously actuated conveyor. In another aspect it relates to the transfer of a filled container from the conveyor of a container-filling machine to a delivery conveyor carrying filled containers away from the filling machine.

Machinery commonly employed in the filling or assembling and filling of cartons often utilizes an endless conveyor which is indexed in a stepwise manner to move the cartons through the various stages of assembly, filling, sealing, marking, and other associated operations. When these various operations have been performed by the filling machine, it is necessary to remove the filled container from the endless conveyor of the filling machine to permit the conveyor space occupied by the filled container to be reused in subsequent filling operations. Various methods and apparatus are known in the art for performing this function. some, for example, use an arm or push rod to displace a filled carton from the endless conveyor of the filling machine. Another method is to dump the filled container from one conveyor to another or to displace it onto an incline and let it slide to another conveyor. While these methods are generally acceptable for the handling of filled cartons having a geometric configuration which will stabilize them against tipping or falling during handling operations subsequent to being filled, many tall containers with relatively small bases and containers made of a material which may tend to stick to a surface rather than to slide across it are difficult to push or gravity slide from one location to another. A substantial number of the types of containers presenting these transfer difficulties are of the gable-top construction.

It is therefore an object of the invention to provide improved apparatus and method for transferring a gable-top container from one location to another. It is a further object of the invention to provide an improved apparatus and method for transferring a gable-top container from an intermittently actuated conveyor to a continuously actuated conveyor. Still a further object of the invention is to provide an improved method and apparatus for transferring filled gable-top containers from the intermittently actuated conveyor of a container-filling machine to a continuously actuated delivery conveyor.

The invention is particularly suited for use with gable-top containers having a large height-to-width ratio or having a coating which may make them difficult to gravity-slide from one location to another. Although the invention can be used with a variety of containers containing almost any product, it is particularly well suited for use in conjunction with a machine which packages milk, orange drink, or other similar liquid in fiberboard, plastic-coated fiberboard, or plastic containers.

In accordance with the invention, each filled container arriving at a specified station along the intermittently actuated conveyor of the filling machine is gripped along the sealed top thereof by a clamp comprising two jaws and is pulled from the conveyor of the filling machine to a desired location on a continuously actuated conveyor whereupon the force holding the jaws together is interrupted and the container is released onto the continuously actuated conveyor.

Details of the operation of the invention are readily observable from the accompanying drawings in which FIG. 1 is an elevational view of a carton forming, filling and sealing machine embodying the present invention;

Figure 4:
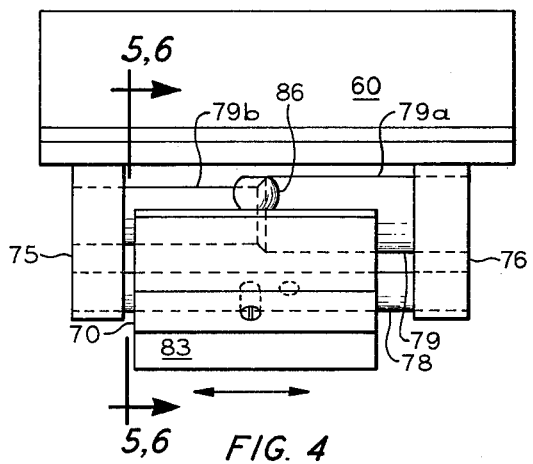
FIG. 4 is an enlarged elevational view of the clamp mechanism shown in FIG. 3.
Figure 6:
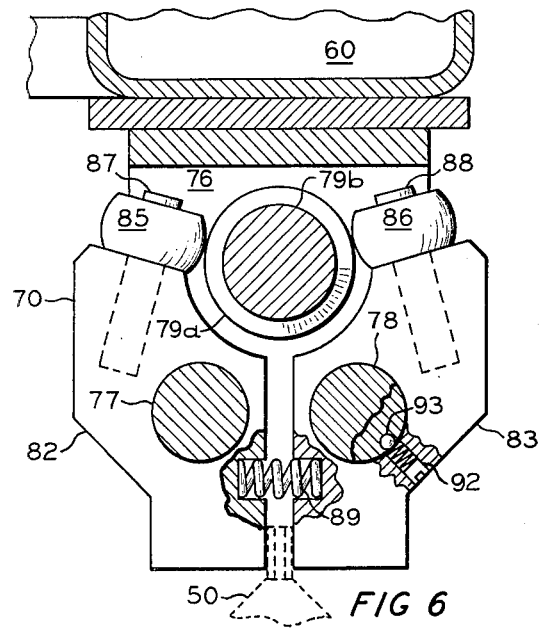

and FIG. 6 is an elevational view taken along line 6—6 in FIG. 4, modified to illustrate the clamp in the closed position.

Figure 1:
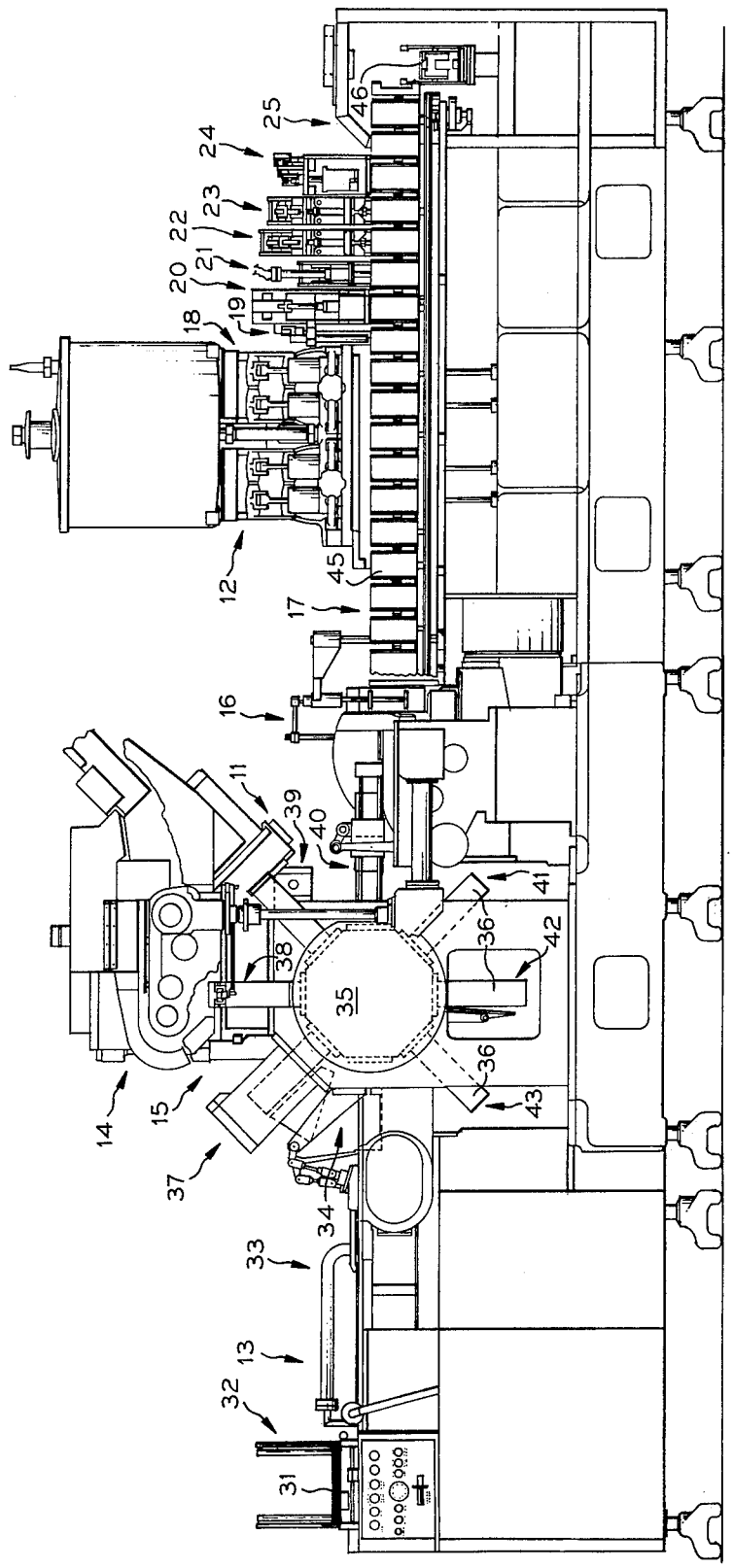

Referring now to the drawings in detail and to FIG. 1 in particular, the carton forming, filling and sealing machine comprises a forming section 11 and a filling and sealing section 12. The forming section 11 comprises a sidewall blank feeding and heating subsection 13, a bottom blank feeding and heating subsection 14, a forming subsection 15, and a transfer subsection 16. The filling and sealing section has two parallel endless conveyor systems 17, and each conveyor system comprises a filling subsection 18 occupying five conveyor stations, a defoaming station 19, a score breaking station 20, a top heating station 21, a folding and sealing station 22, a secondary sealing station 23, a branding station 24, and transfer mechanism 25.

The sidewall blanks 31 manually placed in the sidewall blank magazine 32 are flat, single sheets of paperboard, rectangular in shape, scored to provide five longitudinal panels and a gable-top structure, and coated on both the top and bottom surfaces of each sheet with a thermoplastic material, e.g., polyethylene. The sidewall blanks are successively withdrawn from magazine 32 and individually advanced in a stepwise fashion through the sidewall blank heating station 33 to the sidewall blank receiving station 34 for turret 35. At the sidewall blank heating station 33, the side margins to be overlapped and the bottom margin of the sidewall blank are heated to a bonding temperature for the thermoplastic coating.

The turret 35 is journalled on a horizontal axis and carries eight circumferentially spaced apart mandrels 36 extending radially from the axis of turret 35. The cross section of each of mandrels 36 in a plane perpendicular to its longitudinal axis is generally rectangular. Suitable drive mechanism is provided for indexing or effecting intermittent rotation of the turret 35 to move each mandrel from the sidewall blank receiving station 34 through a blank folding station 37; a bottom end closure forming, applying and sealing station 38; a secondary bottom sealing station 39, a stripping station 40, and three successive nonoperating stations 41, 42, and 43.

The tubular carton body having a bottom closure sealed thereto is removed from the mandrel 36 at the stripping station 40 and is transferred to a conveyor pocket 45 of one of the two conveyor systems 17. The product to be packaged is introduced into the open-topped tubular carton in the filling subsection 18. If desired, any foam resulting from the filling operation can be removed at defoaming station 19. The scores for the gable-top structure can be initially folded in the score breaking station 20, resulting in the conventional six-sided top structure. The gable-top ridge panels of the carton are heated in station 21 to a temperature at least as high as the thermal bonding temperature of the thermoplastic coatings on the carton. The heated superstructure is then folded into contact under pressure at the folding and sealing station 22 to effect the bonding of adjacent ridge panels. Secondary sealing station 23 applies pressure to the ridge panels during cooling of the thermoplastic bond. If desired, a date indicia, plant identification or other information can be applied to the bonded ridge panels of the sealed carton at branding station 24. The formed, filled and sealed carton is removed from its conveyor pocket 45 by the transfer mechanism 25 and placed on a delivery conveyor 46. The conveyor systems 17 are intermittently actuated to move conveyor pockets 45 from stations to station in a step-wise fashion, while delivery conveyor 46 is operated continuously.

Figure 2:
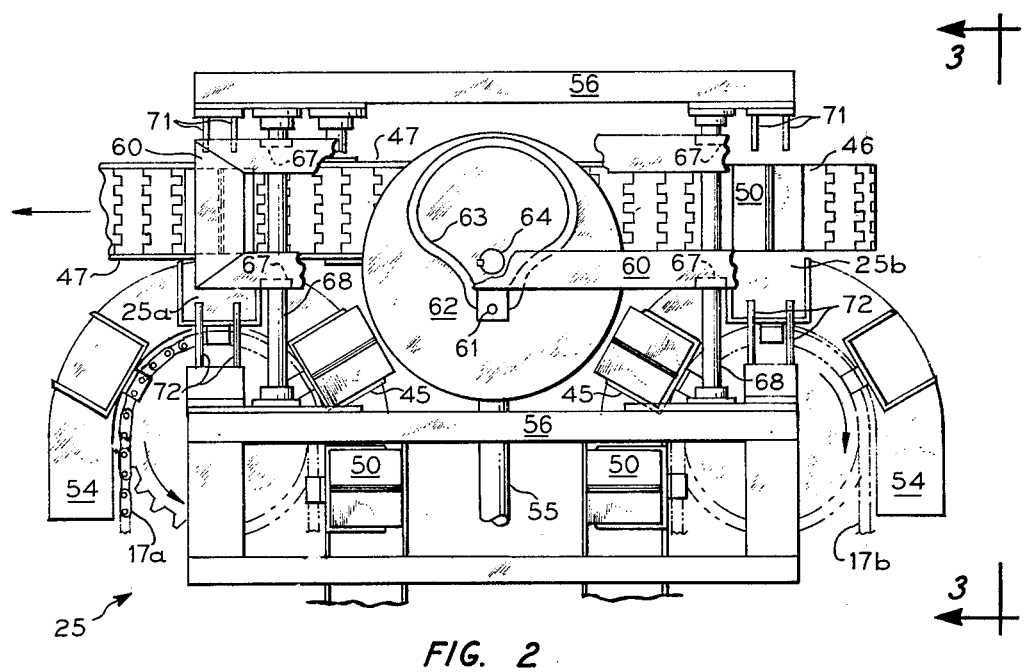
FIG. 2 is a plan view of the product discharge end of the machine of FIG. 1.

FIG. 2 illustrates a partially cut-away plan view of the transfer mechanism 25 associated with the filling and sealing section 12 of the carton-forming, filling and sealing machine of FIG. 1. Endless conveyors 17a and 17b deliver filled and sealed cartons 50 to transfer stations 25a and 25b using conveyor pockets 45 to intermittently slide the cartons 50 along flat rails 54. Endless conveyors 17a and 17b are driven by a reciprocating arm, not shown, and are incrementally indexed in a manner such that two filled and sealed cartons 50 in conveyor pockets 45 are simultaneously advanced to transfer stations 25a and 25b during the advance portion of the conveyor cycle. The conveyor pockets 45 carrying the advanced cartons 50 remain at transfer stations 25a and 25b during the dwell portion of the conveyor cycle, after which the cycle repeats itself, advancing two more containers 50 the incremental distance to transfer stations 25a and 25b. The conveyors 17a and 17b and other major components of the transfer mechanism 25 are supported on the frame 56 of the carton-forming and filling machine.

Conveyor pockets 45 comprise two vertical side plates connected at angles of nominally 90° to a third vertical back plate, the vertical back plate being affixed to the drive means of conveyor 17a or 17b. The U-shaped configuration of conveyor pockets 45 accurately maintains each container 50 at its proper location along conveyor 17a or 17b but also makes it necessary to remove a container from the pocket which has carried it to transfer station 25a or 25b by drawing the container away from the back plate of the pocket in a vertical direction or a horizontal direction perpendicular to the back plate or in a combination of such vertical and horizontal directions. The configuration of the conveyor pockets negates the use of any removal technique involving displacement of the filled container 50 in a lateral direction parallel to the surface of the conveyor pocket back plate.

Flat rails 54 are positioned directly below the line of travel followed by conveyor pockets 45 and are of sufficient width that the bottom surface of each container can rest upon the rail during the dwell portion of the operation of intermittent conveyors 17a and 17b and slide along the rail during the moving portion of the conveyor operation. The top surfaces of both flat rails 54 are substantially in the same horizontal plane, and transfer stations 25a and 25b are preferably located so that a straight delivery conveyor 46 will be tangent to both rails 54 at transfer stations 25a and 25b.

Sub-frame 60, shown partially cut away in FIG. 2 in order to more clearly show the apparatus beneath it, is rectangular in shape and is driven in a reciprocating linear horizontal motion by cam follower 61 attached to the edge of sub-frame 60. The reciprocating linear motion of sub-frame 60 is preferably affected in an at least substantially horizontal plane, although it can be carried out in a plane inclined to the horizontal reference at an angle in the range of about 1° to about 45°, more preferably in the range of about 1° to about 10°. Such an inclined plane would generally extend upwardly from the top face of rail 54 over the top surface of conveyor 46 in order to permit the container to clear the rail 54. Cam follower 61 rides in groove 63 of cam wheel 62 as cam wheel 62 is rotated by the main drive shaft 55 and cam drive shaft 64. Sub-frame 60 is supported on brackets 67 which are slidable on rods 68 attached to the main frame 56.

The delivery conveyor 46 located at a right angle to the center line of the packaging machine is tangent to the curved paths of conveyors 17a and 17b and is adjacent to both transfer stations 25a and 25b to carry filled cartons away from transfer mechanism 25. Guide rails 47 extend above the surface of delivery conveyor 46 to guard against containers being improperly positioned on, or falling from, conveyor 46 and are attached to support bar 48 (FIG. 3) which is in turn attached to the main frame 56 of the carton-forming, filling and sealing machine. The top of conveyor 46 is preferably slightly lower than the top of flat rails 54 to permit containers 50 to move laterally from transfer stations 25a and 25b without contacting the surface of conveyor 46. Positioning the top of conveyor 46 lower than the top of flat rail 54 also permits the top of the carton to travel beneath the clamp 70 (FIG. 3) after it is released onto moving conveyor 46.

Figure 3:
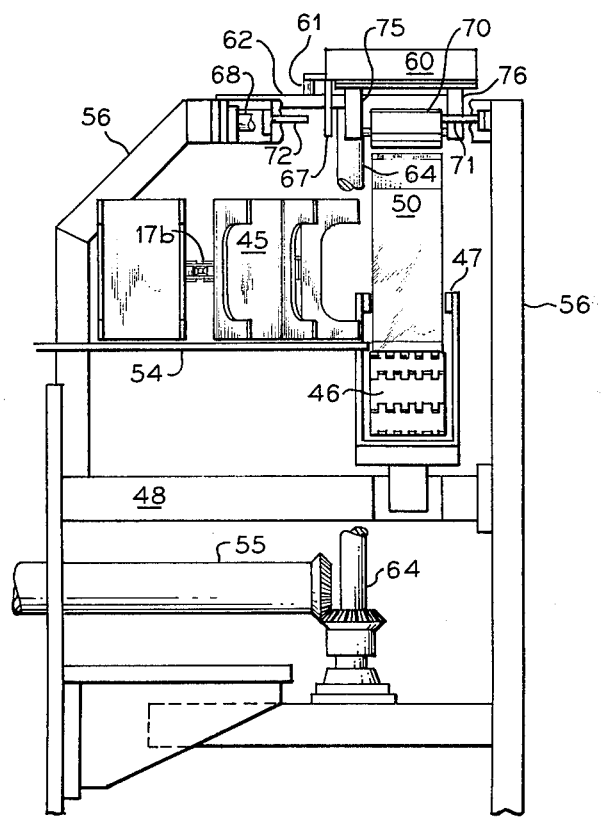
FIG. 3 is a simplified elevational view taken along line 3—3 in FIG. 2.

FIG. 3 is a simplified elevation view of transfer station 25b with sub-frame 60 in its extreme rearward position. Clamp 70 has just released carton 50, dropping it onto conveyor 46, and the carton 50 is beginning to move with conveyor 46, beneath clamp 70 to be inspected and crated for shipment. A pair of rear stop rods 71 attached to main frame 56 open clamp 70 when it reaches the desired rearward position over conveyor 46. A pair of forward stop rods 72 attached to main frame 56 cause the clamp 70 to close and grip a container located in the transfer station 25b when sub-frame 60 has carried clamp 70 to the desired forward location. Clamp 70 is supported beneath sub-frame 60 by clamp brackets 75 and 76.

FIG. 4 is an enlarged elevational view of the clamp 70 shown by FIG. 3. Clamp brackets 75 and 76 attached to sub-frame 60 support jaw shafts 77 and 78 and actuating shaft 79. Actuating shaft 79 has a large diameter portion 79a and a small diameter portion 79b.

Figure 5:
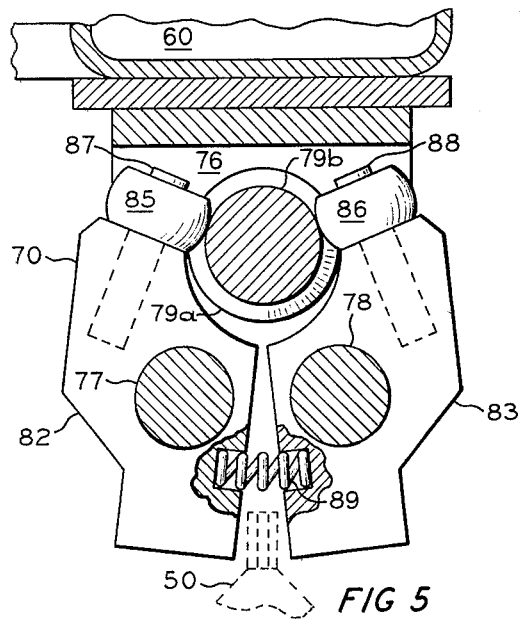
FIG. 5 is an elevational view taken along the line 5—5 in FIG. 4 showing the clamp in the open position.

FIG. 5 is an elevational cross section along line 5—5 of FIG. 4 showing jaws 82 and 83 of clamp 70 which are supported on shafts 77 and 78 respectively. Clamp jaws 82 and 83 are mounted on shafts 77 and 78 in such a manner as to permit rotational movement of each jaw about its respective shaft as well as longitudinal movement of each jaw along its respective shaft. The rotational position of each jaw is controlled by cam followers 85 and 86 attached to jaws 82 and 83 respectively by shafts 87 and 88. Cam followers 85 and 86 are kept in close contact with actuating rod 79 by spring 89 which exerts a force on clamp jaws 82 and 83 tending to force them apart at the point of spring placement. In the position illustrated by FIG. 5, jaws 82 and 83 of clamp 70 are shown in the open position wherein cam followers 85 and 86 are positioned on the small diameter portion 79b of actuating rod 79. Contact of jaws 82 and 83 with a pair of rear stop rods 71 has forced the jaws to an open position as shown in FIG. 4. As the jaws are carried by sub-frame 60 from a position above conveyor 17b to a position above delivery conveyor 46, rear stop rods 71 stop jaws 82 and 83 and hold them while shafts 77 and 78 continue their rearward motion thereby displacing from a position near clamp bracket 76 to a position near clamp bracket 75. As sub-frame 60 approaches its most rearward position, cam followers 85 and 86 move from the large diameter portion 79a to the small diameter portion 79b of actuating rod 79. Jaws 82 and 83 are forced open by the action of spring 89, thereby releasing carton 50.

FIG. 6 viewed along the same section as FIG. 5, illustrates clamp 70 in its closed position. Jaws 82 and 83 of clamp 70 have been stopped by contact with stop rods 72, and, as sub-frame 60 continued its forward motion, have been forced along shafts 77 and 78 to a point nearest clamp bracket 76. In passing from the small diameter portion 79b to the large diameter portion 79a of actuating shaft 79, cam followers 85 and 86 rotate jaws 82 and 83 about shafts 77 and 78 in such a manner as to bring the lower portions of jaws 82 and 83 together to contact the top of gable-top carton 50. Cam followers 85 and 86 are maintained in contact with the large diameter portion 79a of actuating shaft 79 by spring actuated detent latch 92 which engages detent 93 in shaft 78 to maintain jaws 82 and 83 in the closed position.

In operation, filled and sealed cartons are delivered by each conveyor 17a and 17b to transfer stations 25a and 25b simultaneously. The indexing motion of the conveyors 17a and 17b stops the conveyor pockets 45 at the transfer stations 25a and 25b. During the interval that the conveyors are stopped, cam wheel 62 makes one complete revolution. At the start of the rotation of cam wheel 62, the sub-frame 60 is in its rear position with stop rods 71 contacting clamp jaws 82 and 83 to place them in a position near clamp bracket 75 in their open position. As cam wheel 62 rotates, the sub-frame 60 moves forward. As the sub-frame 60 nears the end of its forward motion, stop rods 72 contact jaws 82 and 83, stopping their forward motion and forcing cam followers 85 and 86 outwardly as the large diameter portion 79a of actuating rod 79 passes by, thereby closing the jaws on the top of a container 50 which is located in a conveyor pocket 45 at transfer station 25b. In a similar manner, another clamp 70 located at the opposite end of sub-frame 60 grasps a container 50 located at transfer station 25a. As sub-frame 60 begins its rearward motion, clamps 70 carry the respective cartons 50 from transfer stations 25a and 25b rearward to a position above the delivery conveyor 46. As the sub-frame 60 approaches its most rearward position, rear stop rods 71 contact the jaws of clamp 70, stopping their rearward motion and forcing cam followers 85 and 86 to move to the small diameter position 79b of actuating rod 79, thereby permitting the force exerted by spring 89 to open the jaws and allow the sealed cartons 50 from transfer stations 25a and 25b to drop onto delivery conveyor 46 and be carried away. Conveyors 17a and 17b then advance two more filled and sealed cartons to transfer stations 25a and 25b, and the cycle removing the cartons 50 from the transfer stations 25a and 25b to the delivery conveyor 46 is repeated.

The apparatus of the invention can be made from materials known in the art. Steel, for example, can be used for the frame 56, sub-frame 60, cam follower 61, cam wheel 62, cam drive shaft 64, main drive shaft 65, and other similar structural members of the apparatus. Stainless steel is preferred for conveyor brackets 45 and flat rails 54, where a smooth and corrosion-free surface is particularly desired for contact with the cartons 50. Steel or stainless steel is likewise suitable for the manufacture of clamp jaws 82 and 83, cam followers 85 and 86, actuating rod 79, and other parts of the clamp mechanism.

Reasonable variations and modifications are possible within the scope of the foregoing disclosure and the appended claims to the invention.

What is claimed is:

1. Transfer means for moving a container from a first station to a second station, said transfer means comprising:
    clamp means comprising first and second jaw means rotationally and longitudinally movable on respective first and second supporting shafts, each said jaw means having a cam follower means operably attached thereto,
    means for moving said clamp means between said first and second stations,
    an actuating shaft means having a smaller diameter first segment and a larger diameter second segment,
    means for closing said clamp means at said first station to grasp the top of a container, said means for closing comprising means for forcing longitudinal movement of said first and second jaw means along said first and second supporting shafts thereby bringing each of said cam follower means in contact with one of said first and second segments of said actuating shaft means, and
    means for opening said clamp means at said second station to release said container, said means for opening comprising means for forcing longitudinal movement of said first and second jaw means along said first and second supporting shafts thereby bringing each of said cam follower means in contact with the other of said first and second segments of said actuating shaft means.

2. Apparatus in accordance with claim 1 wherein said means for moving said clamp means between said first and second station comprises means for moving said clamp means in a straight line between said first and second stations.

3. Apparatus for transporting a gable-top container, said apparatus comprising:
    an intermittently actuated conveyor for forwarding a container to a first station located thereon:
    a continuously actuated conveyor having a second station located thereon; and
    transfer means for moving a container from said first station to said second station, said transfer means comprising:
        clamp means comprising first and second jaw means rotationally and longitudinally movable on respective first and second supporting shafts, each said jaw means having a cam follower rigidly attached thereto;

means for moving said clamp means between said first and second stations;

an actuating shaft having a smaller diameter segment and a larger diameter segment;

means for closing said clamp means at said first station to grasp the top of a container, said means for closing comprising a first stop means located adjacent said first station, said first stop means being adapted to contact said first and second jaw means to force longitudinal movement of said first and second jaw means along said first and second supporting shafts thereby bringing said cam followers in contact with said larger diameter segment of said actuating shaft; and means for opening said clamp means at said second station to release said container, said means for opening comprising a second stop means located adjacent said second station, said second stop means being adapted to contact said first and second jaw means to force longitudinal movement of said first and second jaw means along said first and second supporting shafts thereby bringing said cam followers in contact with said smaller diameter segment of said actuating shaft.

4. Apparatus in accordance with claim 3 wherein said means for moving said clamp means between said first station and said second station comprises a movable sub-frame capable of serving a plurality of said transfer means.

5. Apparatus in accordance with claim 4 wherein there are two said intermittently actuated conveyors each having a first transfer station located on a curved portion thereof, wherein said sub-frame has attached to it two said transfer means, wherein said continuously actuated conveyor is tangent to both of said intermittently actuated conveyors at said first transfer stations, and wherein the container-bearing surfaces of said intermittently actuated conveyors are higher than the container-bearing surface of said delivery conveyor.

6. A method of conveying a filled and closed gable-top container, said method comprising:

moving said filled container to a first station, positioning a clamp means having two opposing jaw means so that the top of said container is between opposing portions of said jaw means, moving each of said jaw means longitudinally with respect to a respective jaw means supporting shaft to a first longitudinal position at which a closure means associated with each said jaw means is in contact with a first segment of an actuating means thereby rotating each said jaw means about its respective supporting shaft to grasp the top of said container, removing said clamp means grasping said container to a second station, moving each of said jaw means longitudinally with respect to said respective supporting shafts to a second longitudinal position at which said closure means associated with each said jaw means contacts a second segment of said actuating means thereby rotating each said jaw means about its respective supporting shaft to release said container, and transporting said filled container from said second station.

7. A method in accordance with claim 6 additionally comprising returning said clamp means to said first station.

8. A method in accordance with claim 6 wherein removing said clamp means to a second station comprises removing said clamp means horizontally from said first station to said second station.

9. A method in accordance with claim 6 wherein moving each of said jaw means to said first longitudinal position comprises contacting each of said jaw means with a first stop means upon arrival of said clamp means at said first station and wherein moving each of said jaw means to said second longitudinal position comprises contacting each of said jaw means with a second stop means upon arrival of said clamp means at said second station.

10. A method in accordance with claim 9 additionally comprising simultaneously removing two said filled containers from two said first stations to two said second stations.

11. A method in accordance with claim 6 wherein removing said clamp means grasping said container to a second station comprises removing said clamp means grasping said container in a straight line to said second station.

12. A method in accordance with claim 6 wherein moving said filled container to said first station comprises intermittently actuating a first conveyor and stopping said first conveyor when a filled container is located at said first station and wherein transporting said filled container from said second station comprises continuously actuating a second conveyor.

13. A method in accordance with claim 12 wherein removing said clamp means grasping said container to said second station comprises moving said clamp means linearly from said first station to said second station.

14. A method in accordance with claim 12 wherein removing said clamp means grasping said container to said second station comprises transporting said clamp means grasping said container from said first station to said second station in a straight line, and wherein positioning the clamp means so that the top of the container is between the opposing portions of said jaw means, moving said opposing portion of said jaw means together, and removing said clamp means from said first station are accomplished during the time that said first conveyor is stopped.

15. Apparatus for transferring a gable-top container from a first station to a second station, said apparatus comprising:

clamp means comprising first and second jaw means rotationally and longitudinally movable on respective first and second supporting shafts, each said jaw means having a cam follower rigidly attached thereto;

means for moving said clamp means between said first and second stations;

an actuating shaft having a smaller diameter segment and a larger diameter segment;

means for closing said clamp means at said first station to grasp the top of a container, said means for closing comprising a first stop means located adjacent said first station, said first stop means being adapted to contact said first and second jaw means to force longitudinal movement of said first and second jaw means along said first and second supporting shafts thereby bringing said cam followers in contact with said larger diameter segment of said actuating shaft; and means for opening said clamp means at said second station to release said container, said means for opening comprising a second stop means located adjacent said second station, said second stop means being adapted to contact said first and second jaw means to force longitudinal movement of said first and second jaw means along said first and second supporting shafts thereby bringing said cam followers in contact with said smaller diameter segment of said actuating shaft.

16. Apparatus in accordance with claim 15 wherein said means for moving said clamp means between said first station and said second station comprises a movable sub-frame capable of serving a plurality of said transfer means.

* * * * *